United States Patent
Dan et al.

(10) Patent No.: US 11,604,118 B2
(45) Date of Patent: Mar. 14, 2023

(54) STRUT MODULE TEST MACHINE

(71) Applicant: GM GLOBAL TECHNOLOGY OPERATIONS LLC, Detroit, MI (US)

(72) Inventors: Alexander J. Dan, Ann Arbor, MI (US); Scott P. Sherman, Fenton, MI (US); Timothy J. Colosky, Burt, MI (US); Jarred J. Versical, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 199 days.

(21) Appl. No.: 17/121,816

(22) Filed: Dec. 15, 2020

(65) Prior Publication Data

US 2022/0187168 A1    Jun. 16, 2022

(51) Int. Cl.
*G01M 17/04* (2006.01)
(52) U.S. Cl.
CPC ................... *G01M 17/04* (2013.01)
(58) Field of Classification Search
CPC .................................................. G01M 17/04
See application file for complete search history.

(56) References Cited

U.S. PATENT DOCUMENTS

| | | | |
|---|---|---|---|
| 2008/0275681 A1* | 11/2008 | Langer | G01M 17/04 702/41 |
| 2014/0318229 A1* | 10/2014 | Tagami | G01M 17/06 73/117.01 |
| 2014/0318265 A1* | 10/2014 | Gengler | G01N 3/00 73/788 |

* cited by examiner

*Primary Examiner* — Eric S. McCall
*Assistant Examiner* — Timothy P Graves
(74) *Attorney, Agent, or Firm* — Quinn IP Law

(57) ABSTRACT

A module test machine includes a frame, a fixture, at most two actuators coupled to the fixture, and a controller. The frame is couplable to a first end of a strut module. The fixture is couplable to a second end of the strut module. The fixture includes a plurality of arms with a plurality of adjustable lengths. The at most two actuators are coupled to two of the plurality of arms and configured to impart a plurality of loads along six axes of force at the second end of the strut module. The controller is configured to control the at most two actuators in response to at most two actuator vectors. The plurality of adjustable lengths and the at most two actuator vectors are configured to replicate road load data at the second end of the strut module while under test.

20 Claims, 3 Drawing Sheets

STRUT MODULE TEST MACHINE

INTRODUCTION

The present disclosure relates to a system and a method for a module test machine.

Current bench test methods often sacrifice some vehicle inputs experienced by strut modules for simplicity of the test setup. Two styles of test benches currently used to test strut modules are quarter car rigs and linear damper machines. A quarter car rig utilizes the factory suspension components to control a coning motion of a strut module. The quarter car rigs occupy a large floor space to apply forces in more than one axis, and implement an actuator for each force applied to the tire patch. Body driven inertial forces are often ignored. The linear damper machines have side load mechanisms that are limited to applying either representative side load or moment loads.

What is desired is a technique to configure a module test machine for testing a strut module with accurate in vehicle forces and moments, without incorporating the aggregate suspension components or comprehensive load inputs.

SUMMARY

A module test machine is provided herein. The module test machine includes a frame, a fixture, at most two actuators coupled to the fixture, and a controller. The frame is couplable to a first end of a strut module. The fixture is couplable to a second end of the strut module. The fixture includes a plurality of arms with a plurality of adjustable lengths. The at most two actuators are coupled to two of the plurality of arms and configured to impart a plurality of loads along six axes of force at the second end of the strut module. The controller is configured to control the at most two actuators in response to at most two actuator vectors. The plurality of adjustable lengths and the at most two actuator vectors are configured to replicate road load data at the second end of the strut module while under test.

In one or more embodiments of the module test machine, the fixture includes a first swingarm pivotally coupled to a second swingarm. The first swingarm includes a first arm with a first adjustable length and coupled to the frame, and a second arm with a second adjustable length and coupled to the frame. The second swingarm includes a third arm with a third adjustable length and coupled to a first actuator of the at most two actuators, and a fourth arm with a fourth adjustable length and coupled to a second actuator of the at most two actuators.

In one or more embodiments of the module test machine, the frame defines an x axis, a y axis, and a z axis. The first arm is coupled to the frame at a first offset angle, and the first offset angle is adjustable in an x-z plane. The second arm is coupled to the frame at a second offset angle, and the second offset angle is adjustable in an x-y plane.

In one or more embodiments of the module test machine, the first actuator is coupled to the third arm at a third offset angle, and the third offset angle is adjustable in the x-z plane and configured to move the fixture along at least the z axis. The second actuator is coupled to the fourth arm at a fourth offset angle, and the fourth offset angle is adjustable in the x-y plane and configured to move the fixture along at least the x axis.

In one or more embodiments of the module test machine, each of the first adjustable length, the second adjustable length, the third adjustable length, the fourth adjustable length, the first offset angle, the second offset angle, the third offset angle, and the fourth offset angle is manually adjustable.

In one or more embodiments of the module test machine, each of the at most two actuators is a single-axis actuator.

In one or more embodiments of the module test machine, the fixture and the at most two actuators are configured to provide a motion variable motion ratio.

In one or more embodiments of the module test machine, the fixture and the at most two actuators are configured to provide a variable moment arm and a moment arm moment ratio.

In one or more embodiments of the module test machine, the module test machine is configured by calculating a plurality of geometric parameters for the strut module based on a plurality of geometries of a vehicle configured to incorporate the strut module, determining the road load data of the strut module along the six axes of force, calculating the plurality of adjustable lengths of the plurality of arms of the fixture in the module test machine based on the plurality of geometric parameters, calculating a plurality of moment parameters based on the road load data, calculating the at most two actuator vectors that control the at most two actuators based on the plurality of geometric parameters and the plurality of moment parameters, adjusting the plurality of arms to the plurality of adjustable lengths, and loading the at most two actuator vectors into the controller.

A method for configuring a module test machine is provided herein. The method includes calculating a plurality of geometric parameters for a strut module based on a plurality of geometries of a vehicle configured to incorporate the strut module, determining road load data of the strut module along six axes of force, and calculating a plurality of adjustable lengths of a plurality of arms of a fixture in the module test machine based on the plurality of geometric parameters. The fixture is coupled to a frame of the module test machine and at most two actuators. A first end of the strut module is couplable to the frame. A second end of the strut module is couplable to the fixture. The at most two actuators is configured to impart a plurality of loads along the six axes of force at the second end of the strut module. The method further includes calculating a plurality of moment parameters based on the road load data, calculating at most two actuator vectors that control the at most two actuators based on the plurality of geometric parameters and the plurality of moment parameters, adjusting the plurality of arms to the plurality of adjustable lengths, and loading the at most two actuator vectors into a controller of the module test machine. The plurality of adjustable lengths and the at most two actuator vectors are configured to replicate the road load data at the second end of the strut module while under test.

In one or more embodiments, the method further includes calculating a plurality of offset angles of a subset of the plurality of arms relative to the frame, and adjusting the subset of the plurality of arms to the plurality of offset angles.

In one or more embodiments, the method further includes calculating at most two offset angles of the at most two actuators relative to a subset of the plurality of arms, and adjusting the at most two actuators to the at most two offset angles.

In one or more embodiments of the method, the calculating of the plurality of geometric parameters includes calculating a coning moment for camber in response to the plurality of geometries of the vehicle.

In one or more embodiments of the method, the calculating of the plurality of geometric parameters includes calculating a coning moment for caster in response to the plurality of geometries of the vehicle.

In one or more embodiments of the method, the calculating of the plurality of geometric parameters includes calculating a wheel offset moment in response to the geometries of the vehicle.

In one or more embodiments of the method, the calculating of the plurality of moment parameters includes calculating a bump fore/aft-lateral ratio in response to the road load data.

In one or more embodiments of the method, the calculating of the plurality of moment parameters includes calculating a bump force/moment ratio in response to the road load data.

In one or more embodiments, the method further includes determining the plurality of geometries of the vehicle relative to the strut module by measuring the vehicle.

In one or more embodiments, the method further includes determining the plurality of geometries of the vehicle relative to the strut module from a simulation model of the vehicle.

A module test machine is provided herein. The module test machine includes a frame couplable to a first end of a strut module, at most two actuators that impart a plurality of loads at a second end of the strut module, a first swingarm, a second swingarm, and a controller. The first swingarm has a first arm with a first adjustable length coupled to the frame, and a second arm with a second adjustable length coupled to the frame. The second swingarm is coupled to the first swingarm and couplable to the second end of the strut module. The second swingarm has a third arm with a third adjustable length coupled to a first actuator of the at most two actuators, and a fourth arm with a fourth adjustable length coupled to a second actuator of the at most two actuators. The first actuator and the second actuator are configured to impart the plurality of loads along six axes of force at the second swingarm. The controller is configured to control the at most two actuators in response to at most two actuator vectors. The first adjustable length, the second adjustable length, the third adjustable length, the fourth adjustable length, and the at most two actuator vectors are configured to replicate road load data at the second end of the strut module while under test.

The above features and advantages and other features and advantages of the present disclosure are readily apparent from the following detailed description of the best modes for carrying out the disclosure when taken in connection with the accompanying drawings.

DETAILED DESCRIPTION

Embodiments of the disclosure provide a module test machine and a parameterization method capable of testing a strut module using in-vehicle conditions and without incorporating other components of the vehicle. The module test machine includes a test bench and a controller. The test bench is configured using geometry parameters of a front axle and a front suspension of a vehicle. The controller is programmed with road load data taken from the vehicle and/or standard test data sets. The parameterization method for configuring the module test machine enables the module test machine to apply forces to a strut module under test to provide representative multi-axes vehicle inputs. The module test machine is also configured to measure output responses of the strut module during the tests.

The parameterization method produces a parameterized data set determined by measurements taken from a vehicle and/or extracting from a computerized simulation model of the vehicle. The test bench may be adjusted to match the parameter data set and closely reproduce the vehicle geometries and compliances. The module test machine accurately reproduces in-vehicle load behavior in six degrees of freedom using two single-axis actuators and two adjustable-geometry swingarms. The adjustment capability of the module test machine provides for a motion variable motion ratio and an independent variable moment arm and moment arm motion ratio.

Figure 1:
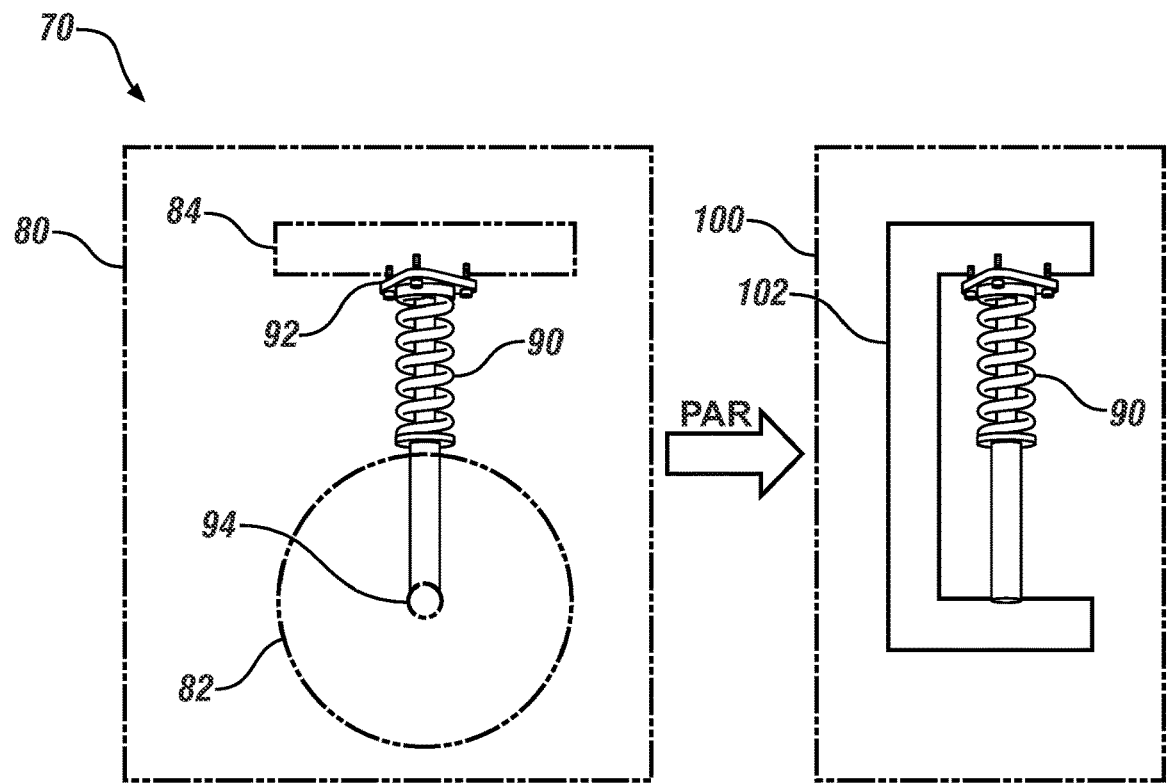
FIG. 1 is a schematic diagram illustrating a context of a system.

Referring to FIG. 1, a schematic diagram illustrating a context of a system 70 is shown. The system 70 generally includes a vehicle and/or vehicle model 80 and a module test machine 100. The vehicle/model 80 defines a wheel 82 and a chassis 84. A strut module 90 is mounted between the wheel 82 and the chassis 84. A first end 92 of the strut module 90 is typically attached to the chassis 84. A second end 94 of the strut module 90 is typically attached to an axle near the wheel 82. The module test machine 100 includes a test bench 102. A strut module 90 is mountable in the test bench 102 during one or more tests.

A parameter data set and road load data experienced by the strut module 90 may be conveyed in a parameter signal (e.g., PAR) to the module test machine 100. The parameters generally include geometries of the vehicle and the road load data. The vehicle geometries may be measured from a front axle and a front suspension of an actual vehicle 80 in which the strut module 90 is utilized and/or from a computer model of the vehicle 80. The road load data may be measured from the actual vehicle 80 and/or obtained from a standard data set. For example, the road load data may be the Road Load Data Acquisition (RLDA) load data and/or Virtual Road Load Data Acquisition (VRLDA) load data for a tire patch. The module test machine 100 may replicate the road load data at the strut module 90 while mounted in the test bench 102.

The vehicle 80 may be implemented as a mobile object or a simulation model of the mobile object. In various embodiments, the vehicle 80 may include, but is not limited to, mobile objects such as automobiles, trucks, motorcycles, boats, trains and/or aircraft. Other types of vehicles 80 may be implemented to meet the design criteria of a particular application. The geometries of the vehicle 80 and the road load data applied to the strut module 90 while the vehicle 80 is in motion may be recorded and/or simulated and subsequently transferred to the module test machine 100 in the parameter signal PAR.

The wheel 82 may be implemented as road wheel or a simulation model of the road wheel. The wheel 82 is generally operational to provide input loads into the strut module 90. Where implemented as a real road wheel, the wheel 82 generally provides for movement of the vehicle 80 about the ground. In various embodiments, the wheel 82 may include a tire mounted on a rim.

The chassis 84 may be implemented as a load-bearing framework of the vehicle 80. In various embodiments, the chassis 84 includes the front axle and the front suspension of the vehicle 80 or a simulation model of the front axle and the front suspension. The chassis 84 is generally operational to provide support for the first end 92 of the strut module 90.

The strut module 90 may be implemented as an automotive suspension component that provides a spring and damper unit. The strut module 90 is generally operational as an upper steering pivot and a suspension mounting for the wheel 82. In various embodiments, the strut module 90 may be a MacPherson strut module. Other types of damper modules may be implemented to meet the design criteria of a particular application.

The first end 92 of the strut module 90 may be implemented as an upper bearing plate. The first end 92 is operational to provide a steering pivot point where the first end 92 attaches to the chassis 84 or the test bench 102.

The second end 94 of the strut module 90 may be implemented as a lower mount assembly. The second end 94 is operational to attach to a suspension knuckle of the wheel 82 or a moveable fixture in the test bench 102.

The module test machine 100 may be implemented as a test assembly suitable for testing the strut module 90. The module test machine 100 may be parameterized by the geometries of the vehicle 80 and measured/simulated road loading data received in the parameter signal PAR. The module test machine 100 may utilize the geometries and the parameters to replicate the road load data at the second end 94 of the strut module 90 while the strut module 90 is under test. The testing generally loads the strut module 90 in six-degrees of freedom.

The test bench 102 is implemented as an automotive test bench that lacks the actual components of a vehicle 80 around the strut module 90. The test bench 102 is operational to support the strut module 90 during the testing and drive the strut module 90 in six axes of freedom.

Figure 2:
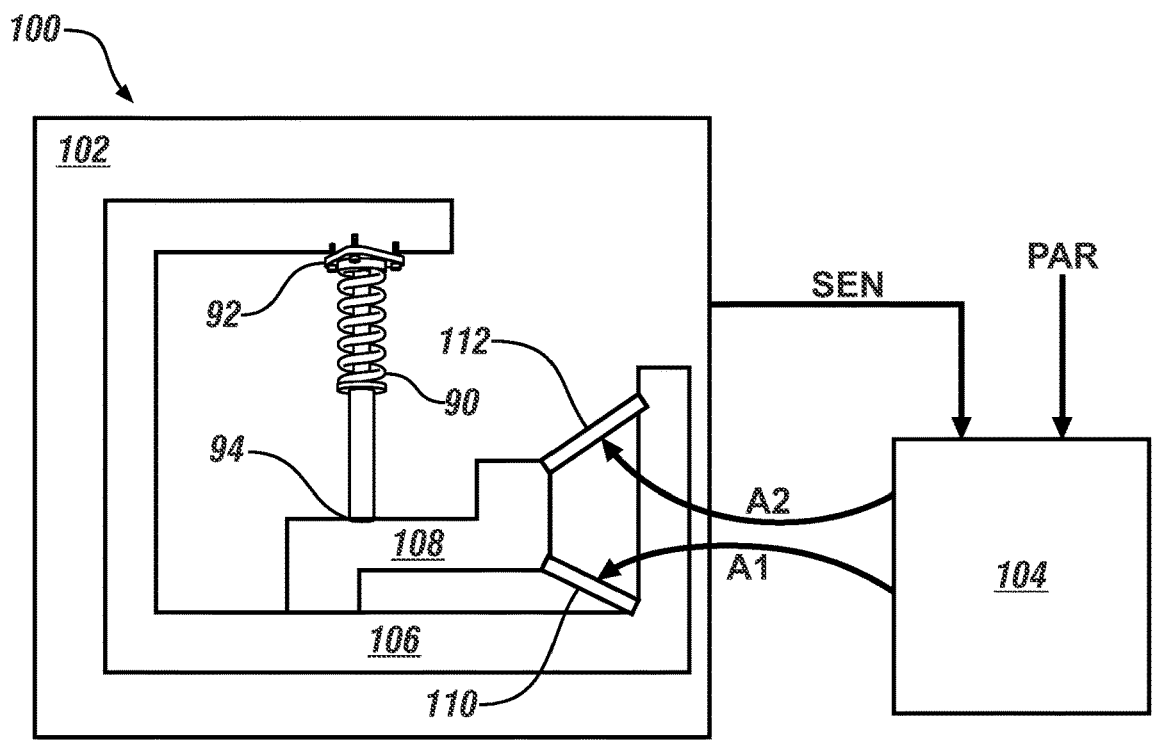
FIG. 2 is a schematic diagram of a module test machine in the system in accordance with one or more exemplary embodiments.

Referring to FIG. 2, a schematic diagram of an example implementation of the module test machine 100 is shown in accordance with one or more exemplary embodiments. The module test machine 100 includes the test bench 102 and a controller 104. The test bench 102 generally includes a frame 106, a fixture 108, and two actuators 110 and 112. The fixture 108 is directly couplable to the frame 106 at multiple adjustable locations. The first actuator 110 and the second actuator 112 are couplable between the fixture 108 and the frame 106. The strut module 90 under test is disposed between the frame 106 and the fixture 108 during the tests.

The parameter signal PAR may be received by the controller 104. A first actuator signal (e.g., A1) may be generated by the controller 104 and transferred to the first actuator 110. A second actuator signal (e.g., A2) may also be generated by the controller 104 and transferred to the second actuator 112. The actuator signals A1 and A2 generally convey actuator vectors used to control movement of the fixture 108. A sensor signal (e.g., SEN) may be generated by one or more sensors in the module test machine 100 and received by the controller 104. The sensor signal SEN may convey sensor data collected from the strut module 90 during the testing.

The test bench 102 may include the first actuator 110, the second actuator 112, and one or more sensors. In various embodiments, additional actuators may be included to provide other motions such as steering motion and the like. The sensors measure the strut module 90 during the tests. The sensors are operational to measure responses of the strut module 90. The responses may be transferred to the controller 104 in the sensor signal SEN.

The controller 104 is implemented as one or more computers. The controller 104 is operational to control the tests applied to the strut module 90 and record a performance of the strut module 90 from the data in the sensor signal SEN. Control of the testing is accomplished by commands presented to the first actuator 110 and the second actuator 112 in response to a set of actuator vectors loaded into the controller 104. Multiple adjustable arm lengths of the fixture 108 and the actuator vectors are configured to replicate road load data at the second end 94 of the strut module 90 while under test.

The frame 106 may be implemented as a support structure. The frame 106 is operational to support the first end 92 of the strut module 90, multiple arms of the fixture 108, the first actuator 110, the second actuator 112, and the sensors.

The fixture 108 may be implemented as a two-part assembly that is couplable to the strut module 90 during the tests. The fixture 108 is operational to impart loads to the strut module 90 along the six axes in response to forces applied by at most the first actuator 110 and the second actuator 112 relative to the frame 106. The fixture 108 generally includes multiple (e.g., four) arms. The arms generally have variable lengths. Some of the arms may be directly coupled to the frame 106. Other arms may be coupled to the first actuator 110 and the second actuator 112.

The first actuator 110 is implemented as a single-axis actuator. The first actuator 110 is operational to apply a first force to the fixture 108. The first force is controlled by the first actuator signal A1. The first actuator 110 is disposed between an arm of the fixture 108 and the frame 106.

The second actuator 112 is also implemented as a single-axis actuator. The second actuator 112 is operational to apply a second force to the fixture 108 independently of the first force. The second force is controlled by the second actuator signal A2. The second actuator 112 is disposed between another arm of the fixture 108 and the frame 106.

Figure 3:
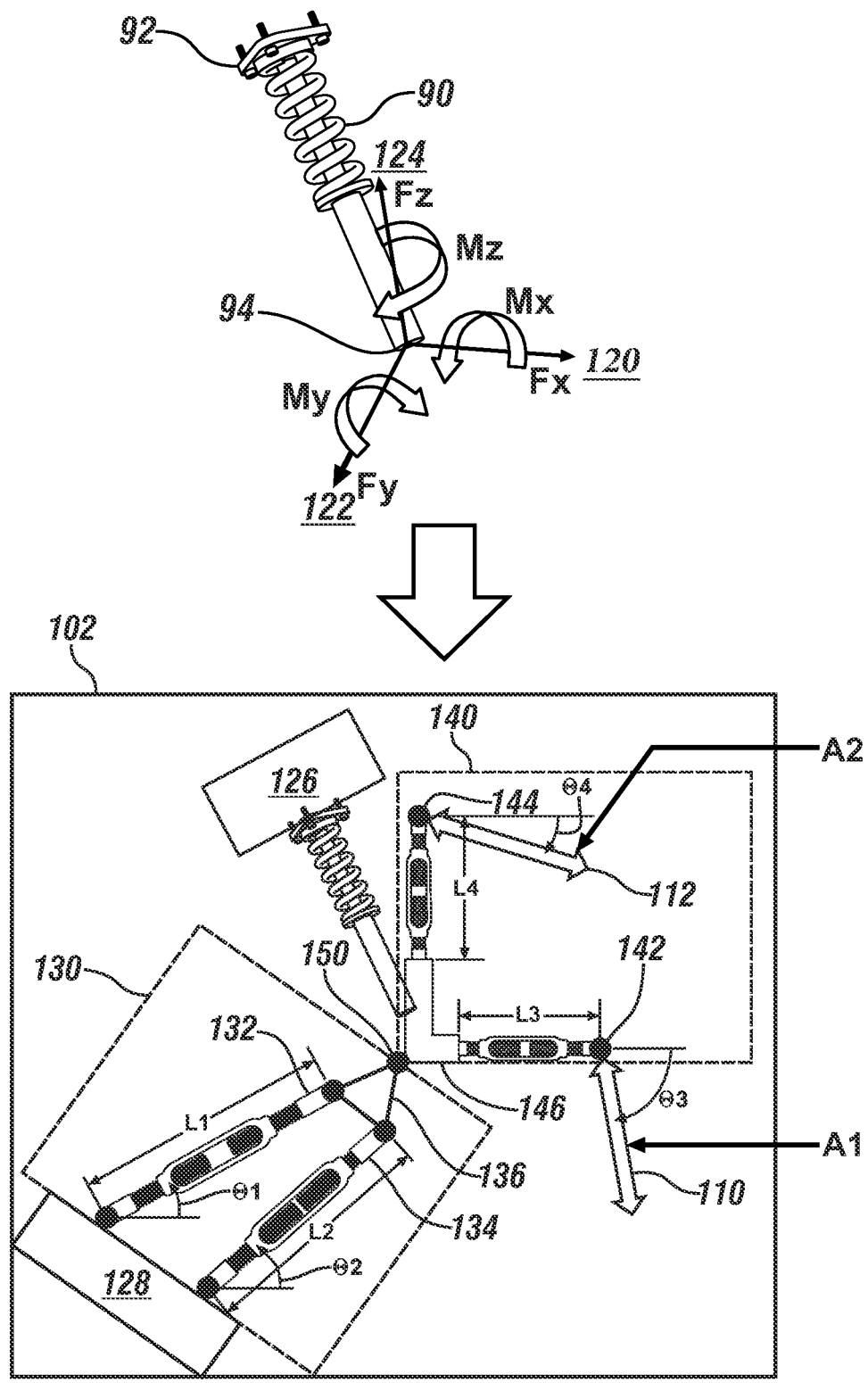
FIG. 3 is a simplified schematic diagram of mechanicals for a test bench in the module test machine in accordance with one or more exemplary embodiments.

Referring to FIG. 3, a simplified schematic diagram of an example implementation of mechanicals for the test bench 102 is shown in accordance with one or more exemplary embodiments. The frame 106 may include a rigid mount 126 and a grounded plane 128. The fixture 108 may include a first swingarm 130, a second swingarm 140, and a ball joint 150. The first swingarm 130 may include a first arm 132, a second arm 134, and a first component 136. The second swingarm 140 may include a third arm 142, a fourth arm 144, and a second component 146. The first component 136 is coupled to the second component 146 by the ball joint 150. The strut module 90 is mountable between the rigid mount 126 of the frame 106 and the second component 146 of the fixture 108.

Movement of the second end 94 of the strut module 90 within the test bench 102 may be defined along three axes. Three axes of motion may be defined by a Cartesian coordinate having an origin at the second end 94. The Cartesian coordinate has an x axis that defines a first axis of motion 120, a y axis that defines a second axis of motion 122, and a z axis that defines a third axis of motion 124. The x axis, the y axis, and the z axis may be orthogonal to each other. Loads applied to the second end 94 of the strut module 90 within the test bench 102 may be defined along six axes. Three axes of force may be defined by a Cartesian coordinate having an origin at the second end 94. The Cartesian coordinate has the x axis that defines a first axis of force Fx, the y axis that defines a second axis of force Fy, and the z axis that defines a third axis of force Fz. The x axis, the y axis, and the z axis may be orthogonal to each other. A fourth axis of force may be a rotational moment Mx about the x axis. A fifth axis of force may be a rotational moment My about the y axis. A sixth axis of force may be a rotational moment Mz about the z axis. An x-y plane is defined by the x axis and the y axis. The x axis and the z axis define an x-z plane. A y-z plane is defined by the y axis and the z axis.

The first swingarm 130 may be implemented as a first linkage that couples the grounded plane 128 to the moving components of the fixture 108. The first swingarm 130 includes the first arm 132 coupled to the first component 136, and the second arm 134 coupled to the first component 136.

The first arm 132 is coupled by a ball joint to the grounded plane 128 and by a connection to the first component 136. In various embodiments, the connection may be another ball joint or a bushing. In some embodiments, the connection may be a rigid connection. The first arm 132 has a manually adjustable first length L1. A first offset angle θ1 in the x-z plane is created between the first arm 132 and the grounded plane 128. The first offset angle θ1 is manually or automatically adjustable over a range of angles between approximately 10 degrees and 80 degrees.

The second arm 134 is coupled by a ball joint to the grounded plane 128 and by a connection to the first component 136. In some embodiments, the connection may be another ball joint or a bushing. In other embodiments, the connection may be a rigid connection. The second arm 134 has a manually adjustable second length L2. A second offset angle θ2 in the x-y plane is created between the second arm 134 and the grounded plane 128. The second offset angle θ2 is manually or automatically adjustable over a range of angles between approximately 10 degrees and 80 degrees.

The second swingarm 140 may be implemented as a second linkage that couples the first actuator 110 and the second actuator 112 to the moving components of the fixture 108. The second swingarm 140 is controlled to behave as the suspension knuckle of the vehicle 80. The second swingarm 140 generally includes a third arm 142 coupled to the second component 146, and a fourth arm 144 coupled to second component 146.

The third arm 142 is rigidly coupled to the second component 146 and pivotally coupled to an end of the first actuator 110 by a ball joint. The third arm 142 has a manually adjustable third length L3. A third offset angle θ3 in the x-y plane is created between the third arm 142 and the first actuator 110. The third offset angle θ3 is manually or automatically adjustable over a range of angles between approximately 10 degrees and 170 degrees.

The fourth arm 144 of the second swingarm 140 is rigidly coupled at one end to the second component 146 and pivotally coupled to an end of the second actuator 112 by a ball joint. The fourth arm 144 has a manually adjustable fourth length L4. A fourth offset angle θ4 in the x-z plane is created between the fourth arm 144 and the second actuator 112. The fourth offset angle θ4 is manually or automatically adjustable over a range of angles between approximately 10 degrees and 170 degrees.

The first actuator 110 is pivotally coupled to the third arm 142 and pivotally coupled to the frame 106. The second actuator 112 is pivotally coupled to the fourth arm 144 and pivotally coupled to the frame 106.

The two separate adjustable lengths L1 and L2 and the two adjustable arm offset angles θ1 and θ2 along the grounded plane 128 generally allow for a close approximation of single and multiple lower control arms of various types of vehicles 80. Adjustments for the arm lengths L3 and L4 and the two adjustable actuator offset angles θ3 and θ4 allow for the forces applied by the first actuator 110 and the second actuator 112 to closely approximate one or more ride events. In various embodiments, the first actuator 110 and the second actuator 112 may be pivotally coupled to the frame 106 to align the input forces to the measured road load data received in the parameter signal PAR. In some embodiments, the road load data may be Road Load Data or Virtual Road Load Data measured from a vehicle or vehicle model.

Figure 4:
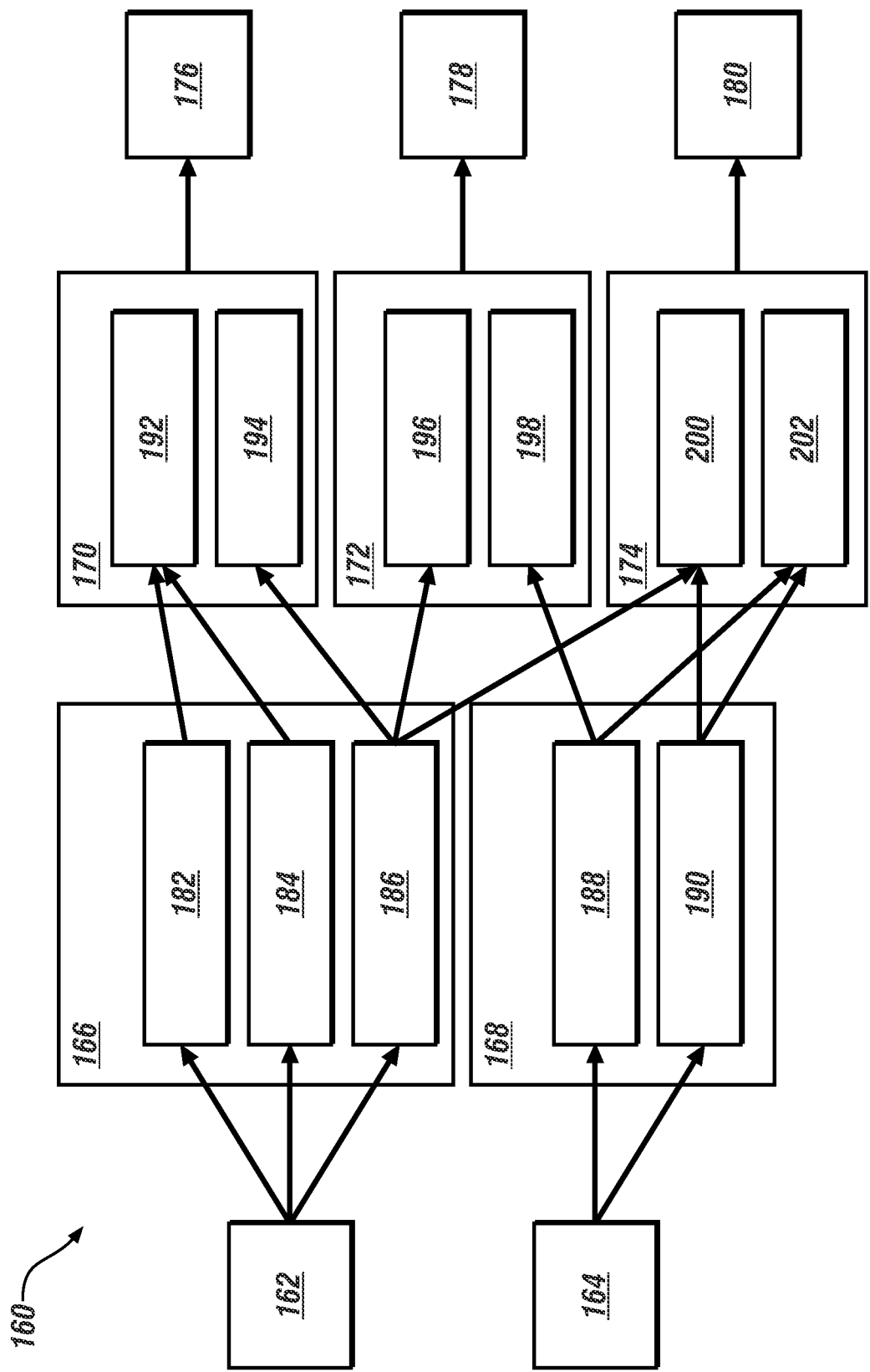
FIG. 4 is a flow diagram of a parameterization flow method for setting up the module test machine in accordance with one or more exemplary embodiments.

Referring to FIG. 4, a flow diagram of an example parameterization flow method 160 for setting up the module test machine 100 is shown in accordance with one or more exemplary embodiments. The method (or process) 160 may be implemented by the system 70. The method 160 generally comprises a step 162, a step 164, a step 166, a step 168, a step 170, a step 172, a step 174, a step 176, a step 178, and a step 180. The step 166 may comprise a step 182, a step 184, and a step 186. The step 168 may comprise a step 188 and a step 190. The step 170 may comprise a step 192 and a step 194. The step 172 may comprise a step 196 and a step 198. The step 174 may comprise a step 200 and a step 202. The sequence of steps is shown as a representative example. Other step orders may be implemented to meet the criteria of a particular application.

In the step 162, the geometries of the vehicle 80 relative to the strut module 90 may be measured and/or extracted from a simulation model. The geometries may include, but is not limited to, control arm lengths, static angles, kingpin axis dimensions, and wheel centers. The vehicle geometry data may be provided to the step 166. In the step 164, the six-axis road load data applied to the strut module 90 while mounted in the vehicle 80 may be optionally measured. Alternatively, the road load data may be obtained from simulations using standard input models. The road load data may be provided to the step 168.

The step 166 may calculate geometric parameters for the strut module 90 based on the vehicle geometry data received from the step 162. Calculations of the geometric parameters may include calculating a coning moment for camber data in the step 182, calculating a coning moment for caster data in the step 184, and calculating a wheel offset moment data in the step 186. The coning moment for camber data and the coning moment for caster data may be provided to the step 170. The wheel offset moment data may be provided to the step 170, the step 172, and the step 174.

In the step 168, moment parameters may be calculated based on the road load data received from the step 164. Calculations of the moment parameters may include bump fore-aft/lateral ratio data calculated in the step 188, and bump force/moment ratio data calculated in the step 190. The moment parameters may be provided to the step 172 and the step 174.

In the step 170, geometry data for the first swingarm 130 and the second swingarm 140 may be calculated based on the geometric parameters received from the step 166. The swingarm geometry data may be presented to the step 176. Calculations for the geometry data may include a calculation of first geometry data for the first swingarm 130 in the step 192 based on the coning moment for camber data from the step 182 and the coning moment for caster data from the step 184. The first geometry data may include the first arm length L1, the second arm length L2, the first offset angle θ1, and the second offset angle θ2. Calculations for the geometry data may also include a calculation of second geometry data for the second swingarm 140 in the step 194 based on the wheel offset moment data from the step 186. The second geometry data may include the third arm length L3 and the fourth arm length L4. The geometry data may be presented to the step 176.

In the step 172, the actuator offset vectors for the first actuator 110 and the second actuator 112 may be calculated based on the geometric parameters from the step 166 and the moment parameters from the step 168. A first actuator vector data for the first actuator 110 may be calculated in the step 196 based on the wheel offset moment data from the step 186. A second actuator vector data for the second actuator 112 may be calculated in the step 198 based on the bump fore-aft/lateral ratio data received from the step 188. The actuator vector data may be presented to the step 178.

In the step 174, the third offset angle θ3 for the first actuator 110 and the fourth offset angle θ4 for the second actuator 112 may be calculated based on the geometric parameter from the step 166 and the moment parameter from the step 168. The third offset angle θ3 may be calculated in the step 200 based on the wheel offset moment data from the step 186 and the bump force/moment ratio data from the step 190. The fourth offset angle θ4 may be calculated in the step 202 based on the bump fore-aft/lateral ratio data from the step 188 and the bump force/moment ratio data from the step 190. The actuator offset angles θ3 and θ4 may be presented to the step 180.

In the step 176, the arm lengths L1, L2, L3, and L4 may be adjusted to the calculated lengths. The adjustments may be accomplished by manually and/or automatically adjusting fixtures in the corresponding arms 132, 134, 142, and 144. Other mechanisms for adjusting the arm lengths may be implemented to meet a design criteria of a particular application.

In the step 178, the actuator vectors may be loaded into the controller 104. In various embodiments, the actuator vectors may be included in the parameters received by the controller 104 in the parameter signal PAR. In other embodiments, the actuator vectors may be calculated based on standard loading profiles and subsequently loaded into the controller 104.

In the step 180, the arm offset angles θ1 and θ2, and the actuator offset angles θ3 and θ4 may be set in the test bench 102. In various embodiments, the offset angles θ1, θ2, θ3, and θ4 may be manually set by adjusting where the first arm 132, the second arm 134, the first actuator 110 and the second actuator 112 are coupled to the frame 106. After the arm lengths L1, L2, L3, and L4 have been set, the offset angles θ1, θ2, θ3, and θ4 have been set, the actuator vectors have been loaded into the controller 104, and the strut module 90 has been installed in the test bench 102, the controller 104 may execute the actuator vectors to test the strut module 90. Control of the fixture 108 in the six axes during the test may be accomplished by at most two actuators (e.g., the first actuator 110 and the second actuator 112) per at most two actuator vectors in the first actuator signal A1 and the second actuator signal A2. Test data gathered during the test may be presented to and stored in the controller 104.

Embodiments of the system 70 generally include a module test machine 100 that uses at most two single-axis actuators 110 and 112 and two adjustable-geometry swingarms 130 and 140 to reproduce six axes strut module input loads. The system 70 may include a methodology that converts six axes of force of strut module input loads from vehicle data and/or simulations into a parameterized data set useable by the module test machine 100 to test one or more strut modules 90. The strut module test bench/parameterization method may test a strut module 90 using in-vehicle conditions without any other components of the vehicle 80.

While the best modes for carrying out the disclosure have been described in detail, those familiar with the art to which this disclosure relates will recognize various alternative designs and embodiments for practicing the disclosure within the scope of the appended claims.

What is claimed is:

1. A module test machine comprising:
   a frame configured to couple to a first end of a strut module;
   a fixture configured to couple to a second end of the strut module, wherein the fixture includes a plurality of arms with a plurality of adjustable lengths;
   at most two actuators coupled to two of the plurality of arms and configured to impart a plurality of loads along six axes of force at the second end of the strut module; and
   a controller configured to control the at most two actuators in response to at most two actuator vectors, wherein the plurality of adjustable lengths and the at most two actuator vectors are configured to replicate road load data at the second end of the strut module while under test.

2. The module test machine according to claim 1, wherein:
   the fixture includes a first swingarm pivotally coupled to a second swingarm;
   the first swingarm includes a first arm with a first adjustable length and coupled to the frame, and a second arm with a second adjustable length and coupled to the frame; and
   the second swingarm includes a third arm with a third adjustable length and coupled to a first actuator of the at most two actuators, and a fourth arm with a fourth adjustable length and coupled to a second actuator of the at most two actuators.

3. The module test machine according to claim 2, wherein:
   the frame defines an x axis, a y axis, and a z axis;
   the first arm is coupled to the frame at a first offset angle;
   the first offset angle is adjustable in an x-z plane;
   the second arm is coupled to the frame at a second offset angle; and
   the second offset angle is adjustable in an x-y plane.

4. The module test machine according to claim 3, wherein:
   the first actuator is coupled to the third arm at a third offset angle;
   the third offset angle is adjustable in the x-z plane and configured to move the fixture along at least the z axis;
   the second actuator is coupled to the fourth arm at a fourth offset angle; and
   the fourth offset angle is adjustable in the x-y plane and configured to move the fixture along at least the x axis.

5. The module test machine according to claim 4, wherein each of the first adjustable length, the second adjustable length, the third adjustable length, the fourth adjustable length, the first offset angle, the second offset angle, the third offset angle, and the fourth offset angle is manually adjustable.

6. The module test machine according to claim 1, wherein each of the at most two actuators is a single-axis actuator.

7. The module test machine according to claim 1, wherein the fixture and the at most two actuators are configured to provide a motion variable motion ratio.

8. The module test machine according to claim 1, wherein the fixture and the at most two actuators are configured to provide a variable moment arm and a moment arm moment ratio.

9. The module test machine according to claim 1, wherein the module test machine is configured by:
   calculating a plurality of geometric parameters for the strut module based on a plurality of geometries of a vehicle configured to incorporate the strut module;
   determining the road load data of the strut module along the six axes of force;
   calculating the plurality of adjustable lengths of the plurality of arms of the fixture in the module test machine based on the plurality of geometric parameters;
   calculating a plurality of moment parameters based on the road load data;
   calculating the at most two actuator vectors that control the at most two actuators based on the plurality of geometric parameters and the plurality of moment parameters;
   adjusting the plurality of arms to the plurality of adjustable lengths; and
   loading the at most two actuator vectors into the controller.

10. A method for configuring a module test machine comprising:
   calculating a plurality of geometric parameters for a strut module based on a plurality of geometries of a vehicle configured to incorporate the strut module;
   determining road load data of the strut module along six axes of force;
   calculating a plurality of adjustable lengths of a plurality of arms of a fixture in the module test machine based on the plurality of geometric parameters, wherein the fixture is coupled to a frame of the module test machine and at most two actuators, a first end of the strut module is configured to couple to the frame, a second end of the strut module is configured to couple to the fixture, and the at most two actuators is configured to impart a plurality of loads along the six axes of force at the second end of the strut module;
   calculating a plurality of moment parameters based on the road load data;
   calculating at most two actuator vectors that control the at most two actuators based on the plurality of geometric parameters and the plurality of moment parameters;
   adjusting the plurality of arms to the plurality of adjustable lengths; and
   loading the at most two actuator vectors into a controller of the module test machine, wherein the plurality of adjustable lengths and the at most two actuator vectors are configured to replicate the road load data at the second end of the strut module while under test.

11. The method according to claim 10, further comprising:
   calculating a plurality of offset angles of a subset of the plurality of arms relative to the frame; and
   adjusting the subset of the plurality of arms to the plurality of offset angles.

12. The method according to claim 10, further comprising:
   calculating at most two offset angles of the at most two actuators relative to a subset of the plurality of arms; and
   adjusting the at most two actuators to the at most two offset angles.

13. The method according to claim 10, wherein the calculating of the plurality of geometric parameters comprises:
   calculating a coning moment for camber in response to the plurality of geometries of the vehicle.

14. The method according to claim 10, wherein the calculating of the plurality of geometric parameters comprises:
   calculating a coning moment for caster in response to the plurality of geometries of the vehicle.

15. The method according to claim 10, wherein the calculating of the plurality of geometric parameters comprises:
   calculating a wheel offset moment in response to the geometries of the vehicle.

16. The method according to claim 10, wherein the calculating of the plurality of moment parameters comprises:
   calculating a bump fore/aft-lateral ratio in response to the road load data.

17. The method according to claim 10, wherein the calculating of the plurality of moment parameters comprises:
   calculating a bump force/moment ratio in response to the road load data.

18. The method according to claim 10, further comprising:
   determining the plurality of geometries of the vehicle relative to the strut module by measuring the vehicle.

19. The method according to claim 10, further comprising:
   determining the plurality of geometries of the vehicle relative to the strut module from a simulation model of the vehicle.

20. A module test machine comprising:
   a frame configured to couple to a first end of a strut module;
   at most two actuators that impart a plurality of loads at a second end of the strut module;
   a first swingarm that has a first arm with a first adjustable length coupled to the frame, and a second arm with a second adjustable length coupled to the frame;
   a second swingarm coupled to the first swingarm and configured to couple to the second end of the strut module, the second swingarm has a third arm with a third adjustable length coupled to a first actuator of the at most two actuators, and a fourth arm with a fourth adjustable length coupled to a second actuator of the at most two actuators, wherein the first actuator and the second actuator are configured to impart the plurality of loads along six axes of force at the second swingarm; and
   a controller configured to control the at most two actuators in response to at most two actuator vectors, wherein the first adjustable length, the second adjustable length, the third adjustable length, the fourth adjustable length, and the at most two actuator vectors are configured to replicate road load data at the second end of the strut module while under test.

* * * * *